United States Patent Office 3,551,215
Patented Dec. 29, 1970

3,551,215
METHOD OF PASSIVATING IRON
Earl B. Claiborne and Edwin E. Sale, Baton Rouge, La., assignors to Esso Research and Engineering Company, a corporation of Delaware
No Drawing. Continuation-in-part of application Ser. No. 600,716, Dec. 12, 1966. This application Sept. 9, 1969, Ser. No. 856,463
Int. Cl. C23f 7/04
U.S. Cl. 148—6.35          8 Claims

ABSTRACT OF THE DISCLOSURE

Active forms of iron obtained from fluidized iron ore reduction processes are passivated by heating them to above about 1050° F. and then either cooling them in an oxygen-containing gas to 800 to 1000° F. within about five minutes or treating in a steam atmosphere at 1200 to 1450° F. and then further cooling them to a temperature below about 400° F. in less than about 45 minutes.

---

This application is a continuation-in-part of copending application Ser. No. 600,716, filed Dec. 12, 1966 now abandoned.

This invention relates to passivating iron, especially very active forms of iron having large surface areas. More particularly, it relates to treating iron, especially porous aggregates of iron, to prevent hydrogen generation upon contact with water.

It is known to prepare finely divided iron particles having large surface areas. One process which makes large quantities of such particles is the fluidized iron ore reduction process wherein particulate iron ore is reduced substantially to metallic iron by direct contact with reducing gas such as hydrogen and/or carbon monoxide. The reduction is carried out at relatively high temperatures, e.g., above about 1000° F. The powdered product from such processes is often used directly in particulate form or, alternatively, it can be compacted into aggregates by rolling, extruding, pelletizing, briquetting, etc. Unless extremely high temperatures and high compacting pressures are employed, aggregates tend to be highly porous, ranging generally from about 5 to 35% porosity and having correspondingly high surface areas ranging from about 5 to 20 square meters per gram.

Whether in the form of a powder or a porous aggregate reduced iron ore having high surface areas and metallizations of 80 to 95% or higher often tends to be highly active when brought into contact with air or water. For example, the iron tends to back-oxidize rapidly, particularly at high temperatures, to convert metallic iron back to iron oxides. Even worse, upon contact with water, active iron will liberate or generate large quantities of hydrogen. This, among other things, also causes back-oxidation and can present serious safety hazards if the reduced iron products are not properly handled. For example, when a pile of active reduced iron briquettes is exposed to atmospheric air and moisture, the resulting reactions will produce intense heat and raise the temperature of the pile until the liberated hydrogen ignites and combusts with the oxygen in the air, producing a fire of extremely high temperature. Aside from the obvious safety hazard which is presented, the high temperatures also cause the briquettes to fuse together while simultaneously increasing the back-oxidation rate such that large quantities of reduced iron product may be converted to a mass of oxides. This, of course, is economically and operationably untenable.

Numerous methods have been proposed to prevent back-oxidation of reduced iron ore and to prevent hydrogen generation. One method is, of course, to eliminate large surface areas by making relatively nonporous aggregates. This is both economically and operationally unattractive since it requires compacting the reduced iron powder at extremely high temperatures and pressures. Another method is to coat the particles or aggregates of reduced ore to prevent their contact with air. Coatings of hydrocarbon materials such as asphalt, plastics, waxes, etc., have been proposed. These are often undesirable contaminants in the product and may also be expensive and inconvenient to apply. Moreover, when the reduced ore product is handled or transported, the coatings may tend to crack or rub off, thus exposing the active iron surfaces to the atmosphere. In such cases, when a fire is initiated, the hydrocarbon coatings merely add to the intensity of the flames.

Still another method for preventing back-oxidation and hydrogen generation is to blanket the active iron product in a dry, inert atmosphere such as nitrogen. This method also can be expensive, if not commercially impractical, since in most cases it is desirable to store reduced iron ore outdoors.

It has now been found that the tendency of active iron to generate hydrogen upon contact with moisture and to back-oxidize on contact with air can be greatly reduced, or even eliminated, in accordance with the present invention.

This invention contemplates a process for passivating highly active forms of iron or reduced iron ore having surface areas above about 5 square meters per gram which comprises heating the iron or reduced ore to a temperature ranging from about 1050° to 1600° F. and then cooling it by contact with a gas containing about 2 to 18.5 mole percent oxygen to a temperature ranging from about 800° to 1000° F. in a time ranging from about one second to about five minutes, preferably about one minute to about four minutes, and further cooling the iron to a temperature below about 400° F., preferably below 200° F., in a gaseous medium, such as air, containing about 2 to 25 mole percent oxygen, in a time of less than about 45 minutes. Thus, it has been surprisingly found that passivation of active iron, and resistance to back-oxidation of reduced ore, can be achieved by deliberately partially oxidizing the iron under carefully controlled conditions.

The heated active iron can, of course, be provided by reducing oxides of iron at temperatures in the 1050° to 1600° F. range and then cooling the heated reduced product in accordance with this invention.

The maximum contact time for the first cooling step (down to about 800° to 1000° F.) should be sufficiently short so that together with the step of further cooling the iron to below 400° F. not more than about 3% of the metallic iron in the product is oxidized back to iron oxides. Preferably, the average metallization of the reduced iron ore will be lowered during cooling by about 0.1% to 2% due to oxidation, lesser oxidation being usually insufficient to passivate the product. Metallization as used herein is defined as the weight percentage of total iron in the reduced ore product which is present as metallic iron, i.e., $$\frac{(\text{metallic Fe} \times 100\%)}{(\text{Total Fe present as metallic Fe and oxides, etc.})}$$

The precise time required for each of the cooling steps will depend on a number of factors, including cooling gas flow rate and temperature, the size and form of the iron or reduced ore particles and the oxygen concentration in the cooling gas. High gas rates will, of course, provide more oxygen contacting and greater cooling than lower gas rates for a given cooling time. Similarly, ambient temperature cooling gases will obviously cool the iron more rapidly than will heated gases. Also, small particulate forms of iron are oxidized and cooled much more readily than aggregates such as pellets or briquettes. The oxygen concentration in the cooling gas will greatly affect the desired cooling time since high concentrations of oxygen will back-oxidize a reduced ore in a correspondingly shorter time than will gases having a low oxygen concentration. It is undesirable, in any event, to use cooling gases containing more than about 18.5 mole percent oxygen in the first cooling step since higher concentrations result in severe product back-oxidation, even with very short contact times.

In the second cooling step rapid cooling or quenching is preferred to minimize further oxidation. It is important also that the iron or reduced ore not be allowed to contact liquid water in the quenching step, as this can destroy the passivity of the product. In a preferred embodiment of the invention air at ambient temperature is used as the oxygen-containing cooling gas in the final cooling step.

In an alternate embodiment of this procedure, the freshly formed reduced iron ore is subjected to a temperature of from about 1200° to 1450° F. to an atmosphere of steam for a period less than about one minute, preferably a period of not less than about ten seconds and not more than about one minute. This step takes the place of the first cooling step mentioned above. When this modification is employed, the subsequent air cooling rate and oxygen concentration is no longer critical and results in considerable savings in equipment and operating costs. Metallization loss is similar to that mentioned above for the first cooling step.

Particularly suitable forms of iron product are aggregates, such as briquettes, having a porosity ranging from about 5 to 30% and a metallization ranging from about 80 to 99+%. Briquettes in this range of metallization and porosity are inclined to be highly active in liberating hydrogen from water and are highly susceptible to back-oxidation in the absence of a passivating treatment.

The following examples and demonstrations will serve to illustrate the high degree of passivity that can be imparted to reduced iron ore products having large and active surface areas by treating them in accordance with this invention.

Active particulate reduced iron ore is produced in a fluidized iron ore reduction process and has a particle size ranging generally from about 1 to 5000 microns, averaging about 250 microns, a surface area averaging about 11 square meters per gram, and a metallization of 94%. A portion of the particulate powder is compacted by conventional means into low porosity D-shaped briquettes measuring 3¾ inches by 1½ inches by 9/16 inch and having a porosity of about 8%. The surface area of the briquettes is about 9 square meters per gram.

A second portion of the particulate reduced ore powder is formed into high porosity briquettes having a porosity of about 32%, but otherwise being identical in size and form to the low porosity briquettes.

Samples of each of the low porosity and high porosity briquettes are immersed in water at 125° F., and the liberated hydrogen is measured as an indication of the product activity. Other samples are tested for susceptibility to back-oxidation in an atmosphere of pure oxygen at 75° F. The results of these measurements are shown below in Table I.

TABLE I

| Sample | $H_2$ generation, s.c.f.h./ton | $O_2$ consumption,[1] s.c.f.h./ton |
|---|---|---|
| Low porosity briquettes | 1.0 | 2.0 |
| High porosity briquettes | 8.5 | 18.0 |

[1] Average $O_2$ consumption over a 6-hour period.

Samples of each of the above forms of product are then heated in a nitrogen atmosphere to 1400° F. and cooled to surface temperatures of about 900° F. in about 3 minutes by blowing ambient temperature gas containing 85 mole percent nitrogen and 15 mole percent oxygen through a bed of the sample material. After cooling to 900° F. the product is then cooled in atmospheric air to 200° F. in about 30 minutes. Samples are then analyzed and tested for metallization, hydrogen generation rate and oxygen consumption rate. The results are shown below in Table II.

TABLE II

| Sample | Percent metallization | $H_2$ generation, s.c.f.h./ton | $O_2$ consumption, s.c.f.h./ton |
|---|---|---|---|
| Low porosity briquettes | 93 | 0.4 | 1.0 |
| High porosity briquettes | 91.5 | 1.0 | 4.0 |

By comparing the $H_2$ generation and oxygen consumption rates for the untreated samples in Table I with the samples of Table II, one can appreciate the astonishing reduction in activity of the iron product treated according to this invention. The data also show that only a very small metallization loss occurs for samples treated according to the invention. In sharp contrast to the foregoing, when air is used in the first cooling step, excessive metallization losses of about 10% or more are encountered. It is also found that when the second cooling step is accomplished by water or steam quenching or cooling in hydrogen or nitrogen, little or no passivity is achieved.

The durability of the passivation treatment according to this invention is further illustrated by comparing the results of long-term atmospheric storage tests on untreated and treated high-porosity briquettes as shown below in Table III.

TABLE III

| | Percent metallization | |
|---|---|---|
| | Untreated briquettes | Treated briquettes |
| Days of storage: | | |
| 0 | 94.0 | 91.5 |
| 10 | 84.0 | 91.0 |
| 20 | 80.0 | 90.5 |
| 30 | 77.0 | 90.0 |
| 40 | 74.5 | 89.5 |
| 50 | 73.0 | 88.5 |
| 60 | 71.0 | 87.0 |

As the data indicate, there is 16% greater loss of metallization in the untreated briquettes than in the briquettes treated in accordance with this invention.

In a test of the alternate passivation technique, i.e., contact with steam, high (<30%) pososity briquettes were treated with steam at a briquette temperature of 1250° F. followed by cooling in air without regard to controlling cooling rate or oxygen content of the coolant. The following results were obtained:

TABLE IV

| | $H_2$ Generation s.c.f.h./hr./ton | | |
|---|---|---|---|
| | No passivation | Controlled air cooling | Steamed 15 seconds, no critical air cooling |
| High porosity briquettes | 17.0 | 7.9 | 6.5 |

The invention is not intended to be limited by the above examples, which are illustrative. Many other variations will be apparent to one skilled in the art.

What is claimed is:

1. A process for passivating active forms of iron obtained from the fluidized reduction of particulate iron ore which comprises heating said iron to a temperature ranging from about 1050° to about 1600° F., contacting said heated iron with a member selected from the group consisting of steam and a gas containing about 2 to 18.5 mole percent oxygen, and when steam is used it is at a temperature of about 1200° to 1450° F. for a time period less than about one minute and when the oxygen containing gas is used the heated iron is cooled to a temperature of about 800° to 1000° F. in a time period ranging from about one second to about five minutes, and further cooling the so contacted heated iron to a temperature below about 400° F., whereby metallization of the heated iron is lowered by an amount ranging up to about 3%.

2. A process for passivating active forms of iron obtained from the fluidized reduction of particulate iron ore which comprises heating said iron to a temperature ranging from about 1050° F. to about 1600° F., treating said iron with an atmosphere of steam at about 1200° to 1450° F. for a period ranging from about 10 seconds to one minute, and cooling said iron to a temperature of less than about 200° F., whereby the metallization of the heated iron is lowered by an amount ranging up to 3%.

3. A process for passivating active forms of iron obtained from the fluidized reduction of particulate iron ore which comprises heating said iron to a temperature ranging from about 1050° to about 1600° F., partially cooling said heated iron in a gas containing about 2 to 18.5 mole percent oxygen to a temperature ranging from about 800° to 1000° F. in a time ranging from about 1 second to about 5 minutes, and further cooling said partially cooled iron to a temperature below about 400° F. in a gas containing about 2 to 25 mole percent oxygen in a time of said further cooling ranging less than about 45 minutes, whereby the metallization of the heated iron is lowered by an amount ranging up to about 3%.

4. The process of claim 3 wherein said heated iron comprises hot aggregates formed by compacting particulate reduced ore at high pressures.

5. The process of claim 4 wherein said partial cooling is achieved in a time ranging from about 1 to 4 minutes.

6. The process of claim 4 wherein said further cooling is achieved in a time less than about 45 minutes by contacting said aggregates with substantially ambient temperature air.

7. The process of claim 4 wherein said partially cooled iron is further cooled to a temperature less than about 200° F. in a time less than about 45 minutes.

8. The process of claim 7 wherein said heated iron is oxidized to lower the metallization thereof between about 0.1 and 2% during said partial cooling and further cooling.

References Cited

UNITED STATES PATENTS

| | | | |
|---|---|---|---|
| 660,533 | 10/1900 | Parr et al. | 148—6.35 |
| 1,056,627 | 3/1913 | Carnahan et al. | 148—6.35 |
| 1,695,041 | 12/1928 | Elmen | 148—6.35X |
| 2,530,345 | 11/1950 | Watts | 148—6.35 |

FOREIGN PATENTS

| | | | |
|---|---|---|---|
| 465,509 | 1937 | Great Britain | 148—6.35 |

RALPH S. KENDALL, Primary Examiner

U.S. Cl. X.R.

75—34; 148—31.5